(12) United States Patent
Yamasaki et al.

(10) Patent No.: US 7,191,608 B2
(45) Date of Patent: Mar. 20, 2007

(54) COOLING APPARATUS

(75) Inventors: Haruhisa Yamasaki, Gunma (JP);
Kenzo Matsumoto, Gunma (JP);
Shigeya Ishigaki, Gunma (JP); Masaji Yamanaka, Gunma (JP); Kentaro Yamaguchi, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/849,787

(22) Filed: May 21, 2004

(65) Prior Publication Data

US 2004/0237552 A1 Dec. 2, 2004

(30) Foreign Application Priority Data

May 30, 2003 (JP) .............................. 2003-155039

(51) Int. Cl.
*F25B 1/00* (2006.01)
(52) U.S. Cl. ...................................................... 62/229
(58) Field of Classification Search .................. 62/226, 62/228.4, 229, 230; 417/42, 45; 318/778, 318/779, 807
See application file for complete search history.

(56) References Cited

U.S. PATENT DOCUMENTS

| 4,724,680 | A |   | 2/1988  | Kawai                      |
|-----------|---|---|---------|----------------------------|
| 4,831,836 | A | * | 5/1989  | Matsuoka ............. 62/209 |
| 5,123,080 | A | * | 6/1992  | Gillett et al. .......... 388/811 |
| 5,126,642 | A | * | 6/1992  | Shahrodi ............. 318/433 |
| 5,323,619 | A | * | 6/1994  | Kim .................... 62/160 |
| 5,617,730 | A | * | 4/1997  | Suzuki ................. 62/133 |
| 5,937,660 | A | * | 8/1999  | Lau et al. ............. 62/174 |
| 5,959,428 | A | * | 9/1999  | Saito et al. .......... 318/705 |
| 6,082,971 | A | * | 7/2000  | Gunn et al. ........... 417/32 |
| 6,134,901 | A | * | 10/2000 | Harvest et al. ........ 62/228.4 |
| 6,206,643 | B1| * | 3/2001  | Jeong .................. 417/45 |
| 6,314,750 | B1|   | 11/2001 | Ishikawa et al.            |
| 6,487,869 | B1| * | 12/2002 | Sulc et al. ........... 62/230 |
| 6,841,967 | B2| * | 1/2005  | Kim et al. ........... 318/727 |
| 2003/0106331 | A1| * | 6/2003 | Yamashita et al. ...... 62/228.4 |

FOREIGN PATENT DOCUMENTS

| DE | 103 29 313 |   | 1/2004 |
|----|------------|---|--------|
| EP | 0 865 152  |   | 9/1998 |
| JP | 55-85843   |   | 6/1980 |
| JP | 59-445482 A| * | 7/1984 |
| JP | 5-45009    |   | 2/1993 |
| JP | 8-282253 A | * | 10/1996 |
| JP | 09-119693  |   | 5/1997 |
| JP | 11-257830  |   | 9/1999 |
| JP | 2002-61968 |   | 2/2002 |
| JP | 2002-71228 |   | 3/2002 |

* cited by examiner

*Primary Examiner*—Mohammad M. Ali
(74) *Attorney, Agent, or Firm*—Westerman, Hattori, Daniels & Adrian, LLP.

(57) ABSTRACT

There is provided a cooling apparatus which can prevent an abnormal increase in pressure of a high side at the time of starting. The cooling apparatus comprises: a refrigerant circuit which uses carbon dioxide as a refrigerant; and a control device which controls a speed of rotation for the compressor between predetermined lowest and highest speeds. The control device runs the compressor by holding a predetermined start-time holding speed of rotation lower than the lowest rotational speed for a predetermined time before the lowest rotational speed is reached after the compressor is started.

2 Claims, 5 Drawing Sheets

COOLING APPARATUS

BACKGROUND OF THE INVENTION

The present invention relates to a cooling apparatus equipped with a refrigerant circuit which includes a compressor to be controlled for a speed of rotation and uses carbon dioxide as a refrigerant.

In a conventional cooling apparatus of such a kind, e.g., a showcase installed at a store, a refrigerant circuit is constituted by sequentially connecting a compressor, a gas cooler (condenser) and diaphragmming means (capillary tube or the like) which constitute a condensing unit and an evaporator installed on a showcase main body side through a pipe in an annular shape. A refrigerant gas compressed by the compressor to become high in temperature and pressure is discharged to the gas cooler. Heat is radiated from the refrigerant gas at the gas cooler, and then the refrigerant gas is diaphragmmed by the diaphragmming means to be fed to the evaporator. The refrigerant evaporates there, and absorbs heat from its surroundings to exhibit a cooling function, thereby cooling the chamber (space to be cooled) of the showcase (e.g., see Japanese Patent Application Laid-Open No. 11-257830).

Recently, in order to solve a problem of ozone layer destruction, a proposal has been made to use carbon dioxide as a refrigerant in the cooling apparatus of the described kind. In the case of using the carbon dioxide as the refrigerant in the cooling apparatus, however, pressure of a high side is increased to about 12 MPa. Especially, at the time of starting a compressor, since such a state is unstable in the refrigerant circuit, the pressure of the high side is easily increased more. The pressure of the high side is abnormally increased to exceed design pressure of the device, and there is a fear of damage to the device in worst case.

SUMMARY OF THE INVENTION

The present invention has been made to solve the foregoing technical problems, and an object of the invention is to provide a cooling apparatus which can prevent an abnormal increase in pressure of a high side at the time of starting.

That is, a first aspect of the present invention is directed to a cooling apparatus comprising a refrigerant circuit which uses carbon dioxide as a refrigerant; and a control device which controls a speed of rotation for the compressor between predetermined lowest and highest speeds, wherein the control device runs the compressor by holding a predetermined start-time holding speed of rotation lower than the lowest rotational speed for a predetermined time before the lowest rotational speed is reached after the compressor is started.

A second aspect of the present invention is directed to the above cooling apparatus, further comprising detection means capable of detecting a state of a space to be cooled by an evaporator included in the refrigerant circuit, wherein the control device shortens the holding time of the compressor when a temperature of the cooled space detected by the detection means is low, and extends the holding time thereof when the temperature of the cooled space is high.

DETAILED DESCRIPTION OF THE PREFERRED EMBODIMENT

Figure 1:
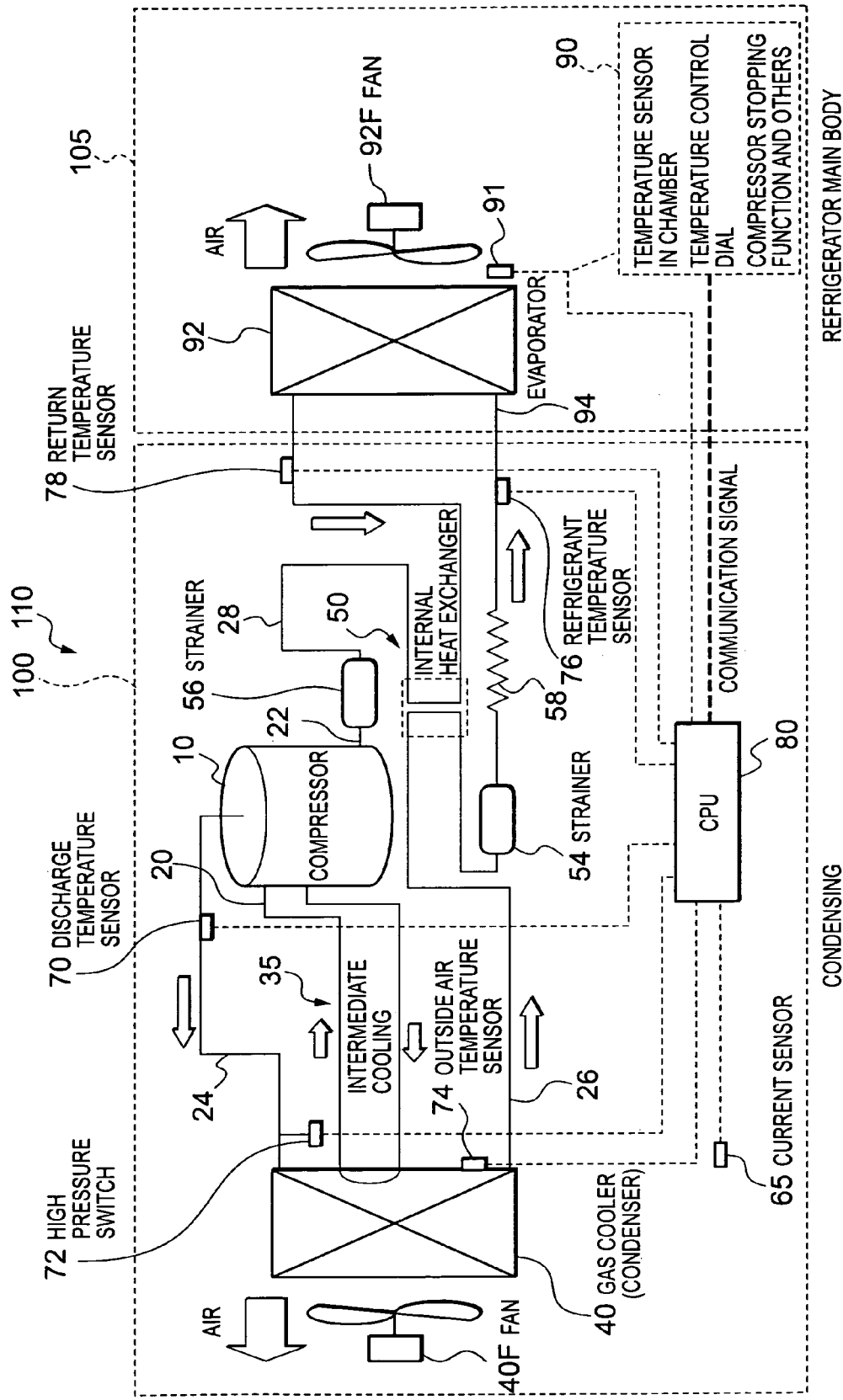
FIG. 1 is a refrigerant circuit diagram of a cooling apparatus according to the present invention.

Next, the preferred embodiment of the present invention will be described in detail with reference to the accompanying drawings. A cooling apparatus 110 of FIG. 1 comprises a condensing unit 100 and a refrigerator main body 105 which becomes a cooler main body. The cooling apparatus 110 of the embodiment is, e.g., a showcase installed at a store. Thus, the refrigerator main body 105 is constituted of an adiabatic wall of a showcase.

The condensing unit 100 comprises a compressor 10, a gas cooler (condenser) 40, a capillary tube 58 etc., and is connected through a pipe to an evaporator 92 of a refrigerator main body 105 (described later). The compressor 10, the gas cooler 40 and the capillary tube 58 constitute a predetermined refrigerant circuit together with the evaporator 92.

That is, a refrigerant discharge tube 24 of the compressor 10 is connected to an inlet of the gas cooler 40. Here, according to the embodiment, the compressor 10 is a multistage (two stages) compression type rotary compressor of an internal intermediate pressure type which uses carbon dioxide ($CO^2$) as a refrigerant. The compressor 10 comprises an electric element disposed as a driving element in a sealed container (not shown), and first and second rotary compression elements (1st and 2nd stages) driven by the electric element.

In the drawing, a reference numeral 20 denotes a refrigerant introduction tube compressed by the first rotary compression element of the compressor 10 to discharge the refrigerant to the outside from the sealed container first and then to introduce the refrigerant into the second rotary compression element. One end of the refrigerant introduction tube 20 is communicated with a cylinder (not shown) of the second rotary compression element. The other end of the refrigerant introduction tube 20 is communicated through an intermediate cooling circuit 35 disposed in the gas cooler 40 (described later) with the inside of the sealed container.

In the drawing, a reference numeral 22 denotes a refrigerant introduction tube for introducing the refrigerant into a cylinder (not shown) of the first rotary compression element of the compressor 10. One end of the refrigerant introduction tube 22 is communicated with the cylinder (not shown) of the first rotary compression element. The other end of the refrigerant introduction tube 22 is connected to one end of a strainer 56. The strainer 56 captures and filters foreign objects such as dusts or chips mixed in a refrigerant gas circulated in the refrigerant circuit, and comprises an opening formed on the other end side thereof and a filter (not shown) of a roughly conical shape tapered from the opening toward one end side thereof. The opening of the filter is mounted in a state of being bonded to a refrigerant pipe 28 connected to the other end of the strainer 56.

Additionally, the refrigerant discharge tube 24 is a refrigerant pipe for discharging the refrigerant compressed by the second rotary compression element to the gas cooler 40.

The gas cooler 40 comprises a refrigerant pipe and a heat exchanging fin disposed heat-exchangeably in the refrigerant pipe. The refrigerant pipe 24 is communicated and connected to an inlet side of the refrigerant pipe of the gas cooler 40. An outside air temperature sensor 74 is disposed as a temperature sensor in the gas cooler 40 to detect an outside air temperature. The outside air temperature sensor 74 is connected to a microcomputer 80 (described later) as a control device of the condensing unit 100.

A refrigerant pipe 26 connected to an outlet side of the refrigerant pipe which constitutes the gas cooler 40 passes through an internal heat exchanger 50. The internal heat exchanger 50 heat-exchanges a refrigerant of a high pressure side from the second rotary compression element which is discharged from the gas cooler 40 with a refrigerant of a low pressure side which is discharged from the evaporator 92 disposed in the refrigerator main body 105. The refrigerant pipe 26 of the high pressure side passed through the internal heat exchanger 50 is passed through a strainer 54 similar to the above to reach the capillary tube 58 as diaphramming means.

One end of a refrigerant pipe 94 of the refrigerator main body 105 is detachably connected to the refrigerant pipe 26 of the condensing unit 100 by a swage locking joint as connection means.

Meanwhile, the refrigerant pipe 28 connected to the other end of the strainer 56 is detachably connected to the refrigerant pipe 94 by a swage locking joint as connection means similar to the above which is passed through the internal heat exchanger 50 to be attached to the other end of the refrigerant pipe 94 of the refrigerator main body 105.

The refrigerant discharge tube 24 includes a discharge temperature sensor 70 disposed to detect a temperature of a refrigerant gas discharged from the compressor 10, and a high pressure switch 72 disposed to detect pressure of the refrigerant gas. These components are connected to the microcomputer 80.

The refrigerant pipe 26 out of the capillary tube 58 includes a refrigerant temperature sensor 76 disposed to detect a temperature of a refrigerant out of the capillary tube 58. This component is also connected to the microcomputer 80. Further, on the inlet side of the internal heat exchanger 50 of the refrigerant pipe 28, a return temperature sensor 78 is disposed to detect a temperature of the refrigerant out of the evaporator 92 of the refrigerator main body 105. This return temperature sensor 78 is also connected to the microcomputer 80.

A reference numeral 40F denotes a fan for venting the gas cooler 40 to air-cool it. A reference numeral 92F denotes a fan for circulating a chill heat-exchanged with the evaporator 92 disposed in a duct (not shown) of the refrigerator main body 105 therein which is a space to be cooled by the evaporator 92. A reference numeral 65 denotes a current sensor for detecting an energizing current of the electric element of the compressor 10 to control running. The fan 40F and the current sensor 65 are connected to the microcomputer 80 of the condensing unit 100, while the fan 92F is connected to a control device 90 (described later) of the refrigerator main body 105.

Here, the microcomputer 80 is a control device for controlling the condensing unit 100. Signal lines from the discharge temperature sensor 70, the high pressure switch 72, the outside air temperature sensor 74, the refrigerant temperature sensor 76, the return temperature sensor 78, the current sensor 65, a temperature in the chamber (described later) disposed in the refrigerator main body 105, and the control device 90 as control means of the refrigerator main body 105 are connected to an input Sensor 91 of the microcomputer 80. Based on these inputs, the microcomputer 80 controls a speed of rotation for the compressor 10 connected to an output by an inverter substrate (not shown, connected to the output to the microcomputer 80), and controls running of the fan 40F.

The control device 90 of the refrigerator main body 105 includes the temperature sensor 91 in the chamber disposed to detect the temperature in the chamber, a temperature control dial disposed to control the temperature in the chamber, a function disposed to stop the compressor 10 etc. Based on these outputs, the control device 90 controls the fan 92F, and sends an ON/OFF signal through the signal line to the microcomputer 80 of the condensing unit 100.

As the refrigerant of the cooling apparatus 110, the aforementioned carbon dioxide ($CO^2$) which is a natural refrigerant is used in consideration of friendliness to a global environment, combustibility, toxicity etc. As oil which is lubricating oil, for example, existing oil such as mineral oil, alkylbenzene oil, ether oil, ester oil or polyalkylene glycol (PGA) is used.

The refrigerator main body 105 is constituted of an adiabatic wall as a whole, and a chamber as a space to be cooled is constituted in the adiabatic wall. The duct is partitioned from the chamber in the adiabatic wall. The evaporator 92 and the fan 92F are arranged in the duct. The evaporator 92 comprises the refrigerant pipe 94 of a meandering shape, and a fan (not shown) for heat-exchanging. Both ends of the refrigerant pipe 94 are detachably connected to the refrigerant pipes 26, 28 of the condensing unit 100 by the swage locking joint (not shown) as described above.

Figure 2:
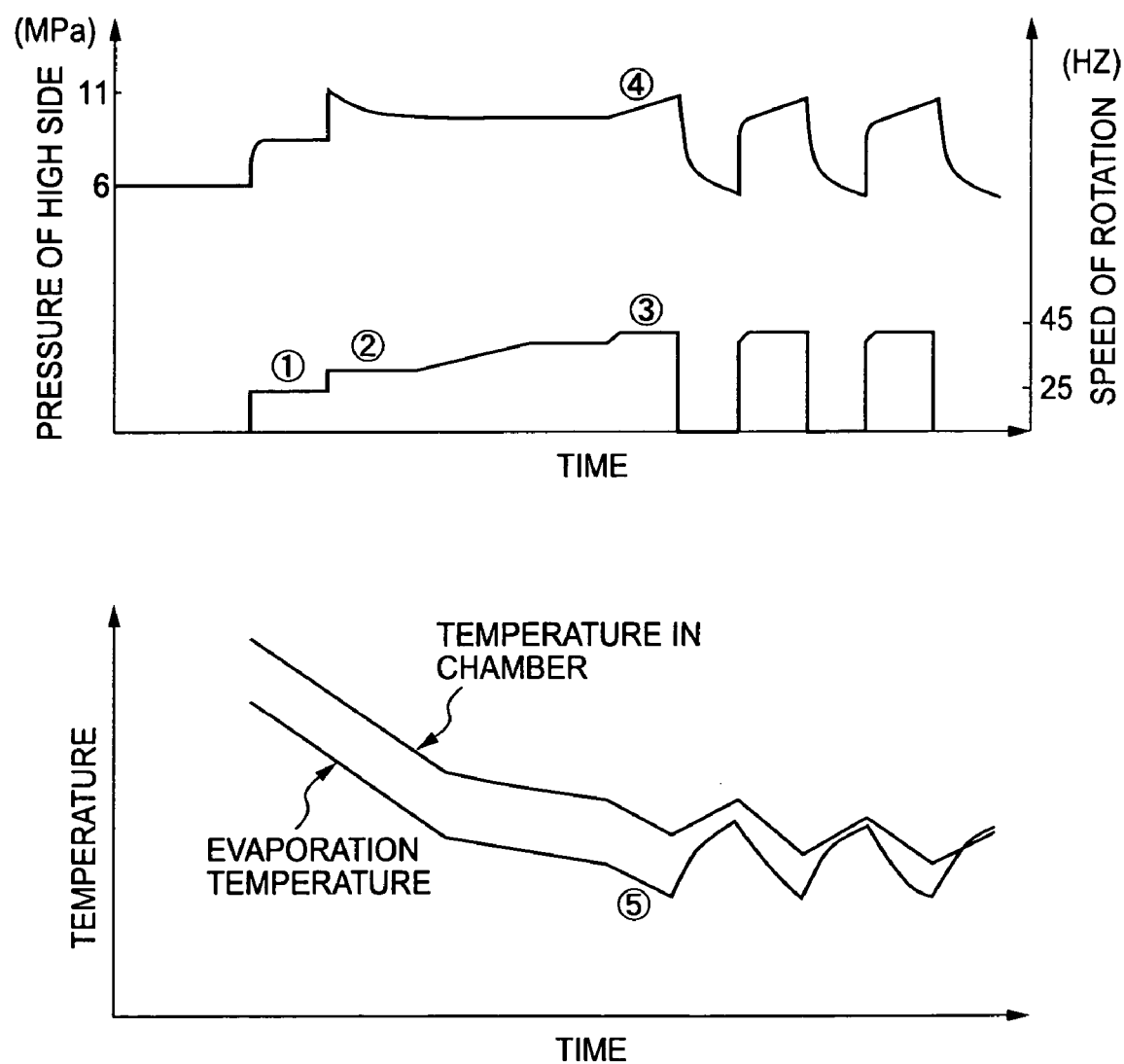
FIG. 2 is a view showing changes in a speed of rotation for a compressor, pressure of a high side, a temperature in the chamber of a refrigerator main body, and an evaporation temperature of a refrigerant in the cooling apparatus of the invention.
Figure 3:
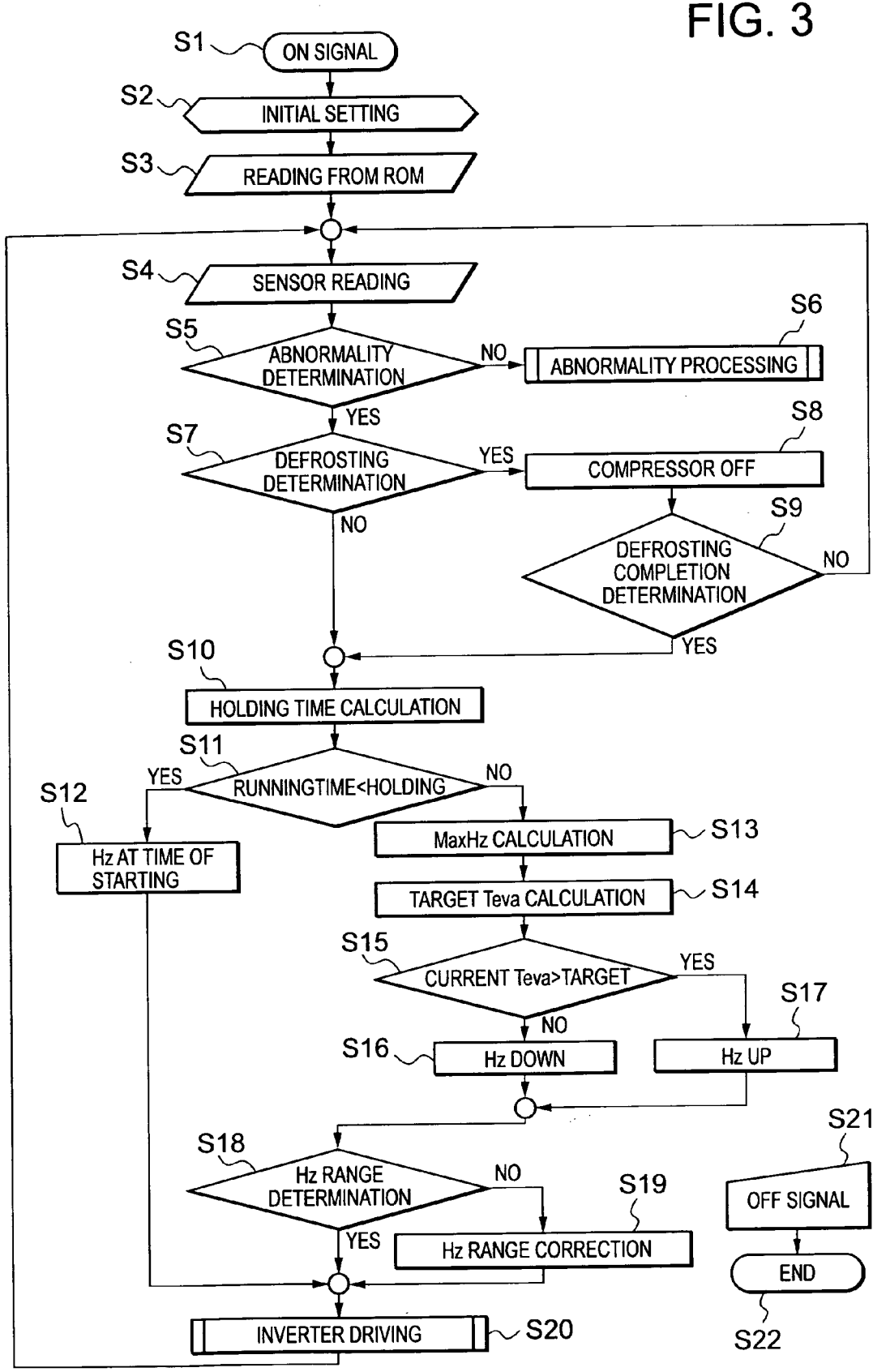
FIG. 3 is a flowchart showing rotational speed control of the compressor by a control device of the cooling apparatus of the invention.

Next, description will be made of an operation of the cooling apparatus 110 of the invention constituted in the foregoing manner with reference to FIGS. 2 to 7. FIG. 2 is a view showing changes in a speed of rotation for the compressor 10, pressure of a high side, temperature in the chamber of the refrigerator main body 105, and evaporation temperature of the refrigerant in the evaporator 92. FIG. 3 is a flowchart showing a control operation of the microcomputer 80.

(1) Start of compressor control

When a start switch (not shown) disposed in the refrigerator main body 105 is turned ON or a power socket of the refrigerator main body 105 is connected to a power outlet, power is supplied to the microcomputer 80 (step S1 of FIG. 3) to enter initial setting in step S2.

In the initial setting, the inverter substrate is initialized to start a program. Upon the start of the program, the microcomputer 80 reads various functions or a constant from a ROM in step S3. In the reading from the ROM of step S3, rotational speed information other than a highest speed of rotation for the compressor 10, and a parameter (described later) necessary for calculating a highest speed of rotation (step S13 of FIG. 3) are read.

After completion of the reading from the ROM in step S3 of FIG. 3, the microcomputer 80 proceeds to step S4 to read sensor information of the discharge temperature sensor 70, the outside air temperature sensor 74, the refrigerant temperature sensor 76, the return temperature sensor 78 or the like, and a control signal of the pressure switch 72, the inverter or the like. Next, the microcomputer 80 enters abnormality determination of step S5.

In step S5, the microcomputer 80 determines turning ON/OFF of the pressure switch 72, a temperature detected by each sensor, a current abnormality or the like. Here, if an abnormality is discovered in each sensor or a current value, or if the pressure switch 72 is OFF, the microcomputer 80 proceeds to step S6 to light a predetermined LED (lamp for notifying an occurrence of an abnormality), and stops running of the compressor 10 at the time of its running. Incidentally, the pressure switch 72 senses an abnormal increase of the pressure of the high side. The switch is turned OFF when pressure of the refrigerant passed through the refrigerant discharge tube 24 becomes, e.g., 13.5 MPaG or higher, and turned ON again when the pressure becomes 9.5 MPaG or lower.

Thus, upon notification of the abnormality occurrence in step S6, the microcomputer 80 stands by for a predetermined time, and then returns to step S1 to repeat the aforementioned operation.

On the other hand, if no abnormality is recognized in the temperature detected by each sensor, the current value or the like, and if the pressure switch 72 is ON in step S5, the microcomputer 80 proceeds to step S7 to enter defrosting determination (described later). Here, if a need to defrost the evaporator 92 is determined, the microcomputer 80 proceeds to step S8 to stop the running of the compressor 10, and repeats the operation from step S4 to step S9 until completion of the defrosting is determined in step S9.

On the other hand, if no need to defrost the evaporator 92 is determined in step S7, or if defrosting completion is determined in step S9, the microcomputer 80 proceeds to step S10 to calculate rotational speed holding time of the compressor 10.

(2) Rotational speed holding control of compressor start

Here, the rotational speed holding of the compressor 10 means running thereof while the microcomputer 80 holds a speed of rotation lower than a lowest speed of rotation for a predetermined time at the time of starting. That is, the microcomputer 80 sets a target speed of rotation within a range of a highest speed of rotation ($Ma_xHz$) obtained in calculation of a highest rotational speed of step S13 (described later) during normal running and a lowest speed of rotation read beforehand in step S3 to run the compressor 10. At the time of starting, however, the microcomputer 80 holds a speed of rotation lower than the lowest rotational speed for a predetermined time before the lowest rotational speed is reached to run the compressor 10 (state of (1) of FIG. 2).

For example, if the lowest rotational speed read from the ROM in step S3 of FIG. 3, the microcomputer 80 holds a speed of rotation (25 Hz according to the embodiment) equal to/lower than 90% of 30 Hz for a predetermined time to run the compressor 10.

The above state will be described in detail with reference to FIG. 4. If the microcomputer 80 starts running of the compressor 10 at 30 Hz which is a lowest speed of rotation without holding a speed of rotation lower than the lowest rotational speed for a predetermined time different from the conventional case, pressure of a high side suddenly increases at the time of starting as indicated by a broken line of FIG. 4, and there is a fear that design pressure (limit of withstand pressure) of the device, the pipe or the like disposed in the refrigerant circuit may be exceeded in a worst case. Assuming that a lowest speed of rotation is preset to 30 Hz or lower to run the compressor 10, if the rotational speed is lowered below 30 Hz during running, there occurs a problem of a considerable increase in noise or vibration generated from the compressor 10.

Figure 4:
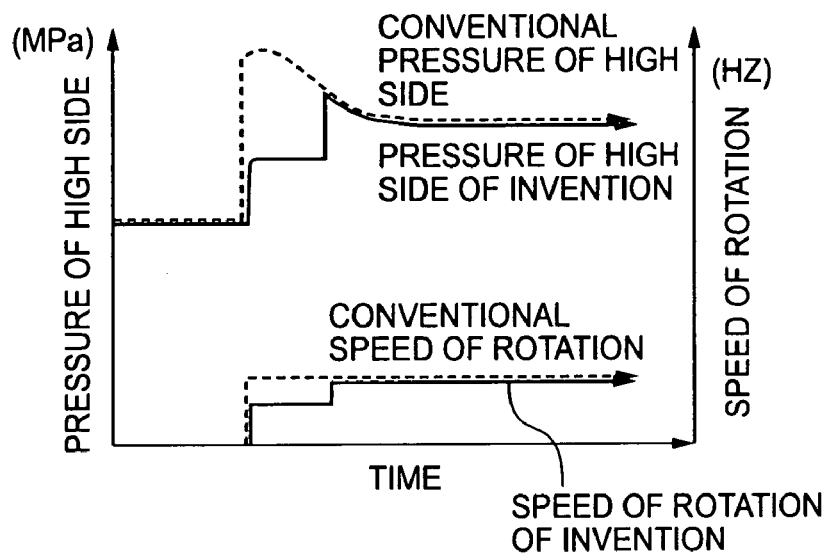
FIG. 4 is a view showing changes in a speed of rotation for the compressor and pressure of the high side at the time of starting.

However, if the microcomputer 80 runs the compressor 10 by holding the speed of rotation (25 Hz) lower than the lowest rotational speed for a predetermined time before the rotational speed of the compressor 10 reaches a predetermined rotational speed at the time of starting as indicated by a solid line of FIG. 4, it is possible to prevent an abnormal increase in the pressure of the high side.

Additionally, since the rotational speed never drops below 30 Hz during running, it is possible to suppress even noise or vibration from the compressor 10.

Further, the holding time of the rotational speed is decided based on the temperature in the chamber of the refrigerator main body 105 which is a temperature of the space to be cooled by evaporator 92 in step S10. That is, according to the embodiment, if a temperature in the chamber detected by the temperature sensor 91 in the chamber as a cooled state sensor is equal to/lower than +20° C., the microcomputer 80 runs the compressor 10 by holding its rotational speed at 25 Hz for, e.g., 30 sec., and then increases the rotational speed to the lowest rotational speed (30 Hz) (state of (2) in FIG. 3). In other words, if the temperature in the chamber of the refrigerator main body 105 is equal to/lower than +20° C., a temperature is low in the evaporator, and there are many refrigerants. Thus, even without setting a holding time so long, an abnormal increase in the pressure of the high side can be prevented to shorten the holding time. Accordingly, since it is possible to transfer to normal rotational speed control based on highest and lowest rotational speeds within a short time, the chamber of the refrigerator main body 105 can be quickly cooled.

Therefore, it is possible to prevent an abnormal increase in the pressure of the high side while suppressing a reduction in a cooling efficiency in the refrigerator main body 105 as much as possible.

On the other hand, if the temperature in the chamber detected by the temperature sensor 91 in the chamber is higher than +20° C., the microcomputer 80 runs the compressor 10 by holding its speed of rotation at 25 Hz for 10 sec., and then increases the speed of rotation to the lowest rotational speed. If the temperature in the chamber of the refrigerator main body 105 is higher than +20° C., a state is unstable in the refrigerant cycle and the pressure of the high side is easily increased. In other words, if the holding time is 30 sec. as described above, the holding time of the rotational speed is too short to prevent an abnormal increase in the pressure of the high side. Thus, by extending the holding time to 10 mm., it is possible to surely prevent the abnormal increase of the high pressure side, and to secure a stable running state.

Therefore, after the start of the compressor, the microcomputer 80 runs it by holding the rotational speed at 25 Hz for the predetermined time before the lowest rotational speed is reached, and properly changes the holding time based on the temperature in the chamber of the refrigerator main body 105, whereby the abnormal increase in the pressure of the high side can be effectively prevented, and reliability and performance of the cooling apparatus 110 can be improved.

After the rotational speed holding time of the compressor 10 is calculated based on the temperature in the chamber in step S10 of FIG. 3 as described above, the microcomputer 80 starts the compressor 10 in step S11. Then, the running time thus far is compared with the holding time calculated in step S10. If the running time from the start of the compressor 10 is shorter than the holding time calculated in step S10, the process proceeds to step S12. Here, the microcomputer 80 sets the aforementioned starting time Hz of 25 Hz equal to a target rotational speed of the compressor 10, and proceeds to step S20. Subsequently, in step S20, the compressor 10 is run at a rotational speed of 25 Hz by the inverter substrate as described later.

That is, upon a start of the electric element of the compressor 10 at the aforementioned rotational speed, a refrigerant is sucked into the first rotary compression element of the compressor 10 to be compressed, and then discharged into the sealed container. The refrigerant gas discharged into the sealed container enters the refrigerant introduction tube 20, and goes out of the compressor 10 to flow into the intermediate cooling circuit 35. The intermediate cooling circuit 35 radiates heat by an air cooling system while passing through the gas cooler 40.

Accordingly, since the refrigerant sucked into the second rotary compression element can be cooled, a temperature increase can be suppressed in the sealed container, and compression efficiency of the second rotary compression element can be improved. Moreover, it is possible to suppress a temperature increase of the refrigerant compressed by the second rotary compression element to be discharged.

Then, the cooled refrigerant gas of intermediate pressure is sucked into the second rotary compression element of the compressor 10, subjected to compression of the second stage to become a refrigerant gas of high pressure and a high temperature, and discharged through the refrigerant discharge tube 24 to the outside. By this time, the refrigerant has been compressed to proper supercritical pressure. The refrigerant gas discharged from the refrigerant discharge tube 24 flows into the gas cooler 40, radiates heat therein by the air cooling system, and then passes through the internal heat exchanger 50. Heat of the refrigerant is removed by the refrigerant of the low pressure side there to be further cooled.

Because of the presence of the internal heat exchanger 50, the heat of the refrigerant discharged out of the gas cooler 40 to pass through the internal heat exchanger 50 is removed by the refrigerant of the low pressure side, and thus a supercooling degree of the refrigerant becomes larger by a corresponding amount. As a result, the cooling efficiency of the evaporator 92 can be improved.

The refrigerant gas of the high pressure side cooled by the internal heat exchanger 50 is passed through the strainer 54 to reach the capillary tube 58. The pressure of the refrigerant is lowered in the capillary tube 58, and then passed through the swage locking joint (not shown) to flow from the refrigerant pipe 94 of the refrigerator main body 105 into the evaporator 92. The refrigerant evaporates there, and sucks heat from surrounding air to exhibit a cooling function, thereby cooling the chamber of the refrigerator main body 105.

Subsequently, the refrigerant flows out of the evaporator 92, passes from the refrigerant pipe 94 through the swage locking joint (not shown) to enter the refrigerant pipe 26 of the condensing unit 100, and reaches the internal heat exchanger 50. Heat is removed from the refrigerant of the high pressure side there, and the refrigerant is subjected to a heating operation. Here, the refrigerant evaporated by the evaporator 92 to become low in temperature, and discharged therefrom is not completely in a gas state but in a state of being mixed with a liquid. However, the refrigerant is passed through the internal heat exchanger 50 to be heat-exchanged with the refrigerant of the high pressure side, and thus the refrigerant is heated. At a point of this time, the refrigerant is secured for a degree of superheat to become a gas completely.

Accordingly, since the refrigerant out of the evaporator 92 can be surely gasified, without disposing an accumulator or the like on the low pressure side, it is possible to surely prevent liquid backing in which a liquid refrigerant is sucked into the compressor 10, and a problem of damage given to the compressor 10 by liquid compression. Therefore, it is possible to improve reliability of the cooling apparatus 110.

Incidentally, the refrigerant heated by the internal heat exchanger 50 repeats a cycle of being passed through the strainer 56 to be sucked from the refrigerant introduction tube 22 into the first rotary compression element of the compressor 10.

(3) Control of change in highest speed of rotation for compressor based on outside air temperature When time passes from the start, and the running time thus far reaches the holding time calculated in step S10 of FIG. 3 in step S11, the microcomputer 80 increases the rotational speed of the compressor 10 to the lowest rotational speed (30 Hz) (state of (2) in FIG. 3). Then, the microcomputer 80 proceeds from step S10 to step S13 to calculate a highest speed of rotation ($Ma_xHz$). This highest rotational speed is calculated based on an outside air temperature detected by the outside air temperature sensor 74.

Figure 5:
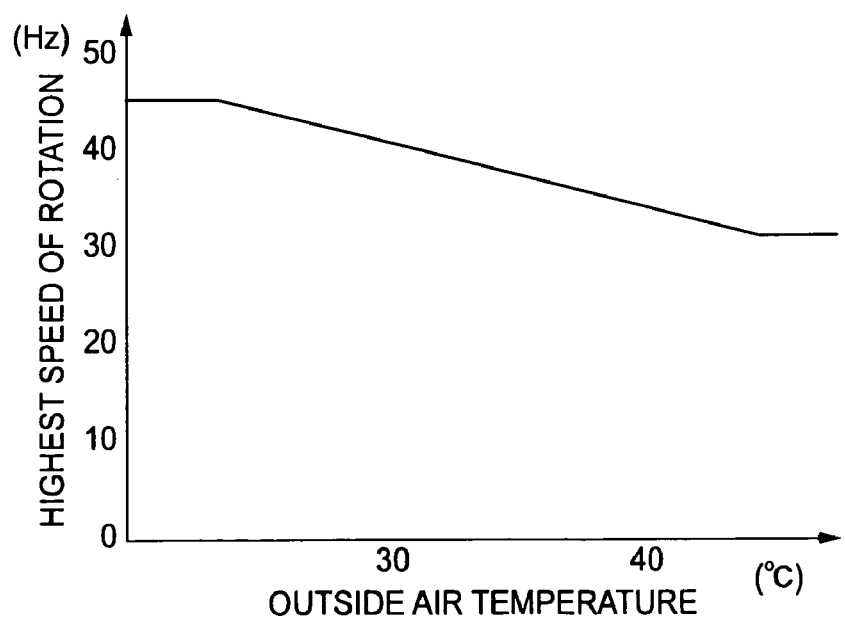
FIG. 5 is a view showing a relation between an outside air temperature and a highest speed of rotation for the compressor in the cooling apparatus of the invention.

That is, the microcomputer 80 lowers the highest rotational speed of the compressor 10 if the outside air temperature detected by the outside air temperature sensor 74 is high, and increases the highest rotational speed thereof if the outside air temperature is low. The highest rotational speed is calculated within a range of preset upper and lower limit values (respectively 45 Hz and 30 Hz according to the embodiment) as shown in FIG. 5. This highest rotational speed is lowered in a linear functional manner when the outside air temperature increases, and increased in the same manner when the outside air temperature decreases as shown in FIG. 5.

If the outside air temperature is high, a temperature of the refrigerant circulated in the refrigerant circuit becomes high to cause an easy abnormal increase in the pressure of the high side. Thus, by setting the highest speed of rotation low, it is possible to prevent the abnormal increase in the pressure of the high side as much as possible. On the other hand, if the outside air temperature is low, the temperature of the refrigerant circulated in the refrigerant circuit is low to make an abnormal increase difficult in the pressure of the high side. Thus, it is possible to set the highest speed of rotation high.

Therefore, since a target speed of rotation (described later) becomes equal to/lower than the highest rotational speed, by setting the highest rotational speed to a value in which an abnormal increase is difficult in the pressure of the high side, it is possible to effectively prevent the abnormal increase in the pressure of the high side.

(4) Target evaporation temperature control at evaporator

After the highest speed of rotation is decided in step S13 of FIG. 3 as described above, the microcomputer 80 proceeds to step S14 to calculate a target evaporation temperature Teva. The microcomputer 80 presets a target evaporation temperature of the refrigerant at the evaporator 92 based on the temperature in the chamber of the refrigerator main body 105 detected by the temperature sensor 91 in the chamber, and sets the target rotational speed within the range of the highest and lowest rotational speeds of the compressor 10 so that an evaporation temperature of the refrigerant which has flown into the evaporator 92 can be the target evaporation temperature, thereby running the compressor 10.

Then, the microcomputer 80 sets a target evaporation temperature of the refrigerant at the evaporator 92 in a relation of being higher as the temperature in the chamber is higher based on the temperature in the chamber detected by the temperature sensor 91 in the chamber. Calculation of the target evaporation temperature Teva in this case is carried out in step S15.

That is, of Tya and Tyc calculated by two equations of Tya=Tx×0.35−8.5 and Tyc=Tx×0.2−6+z, a smaller numerical value is set as a target evaporation temperature Teva. Incidentally, in the equations, Tx denotes a temperature in the chamber (one of indexes indicating the cooled state of the chamber which is a space to be cooled) detected by the temperature sensor 91 in the chamber, and z denotes a value (z=Tr (outside air temperature) −32) obtained by subtracting 32 (deg) from an outside air temperature Tr detected by the outside air temperature sensor 74.

Figure 6:
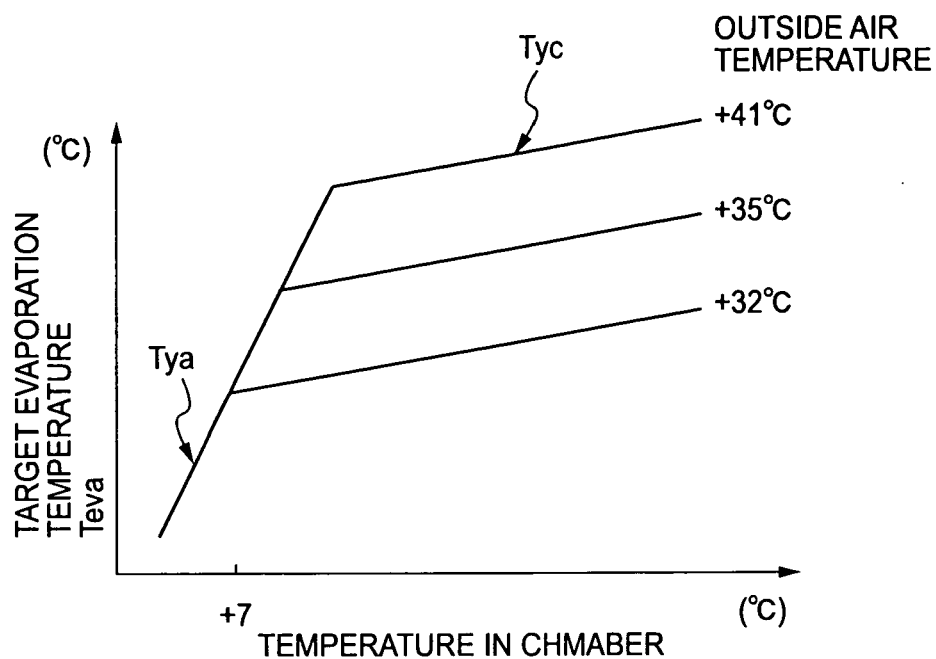
FIG. 6 is a view showing a relation between a target evaporation temperature and a temperature in the chamber at each outside air temperature in the cooling apparatus of the invention.

FIG. 6 shows changes in the target evaporation temperature Teva at +32° C., +35° C. and +41° C. of the outside air temperatures Tr detected by the outside air temperature sensor 74 in this case. As shown in FIG. 6, a change in the target evaporation temperature Teva set by the above equations after a change in the temperature in the chamber is small in a region of a high temperature in the chamber Tx, and a change in the target evaporation temperature Teva after a changed in the temperature in the chamber Tx is large in a region of a low temperature in the chamber Tx.

That is, the microcomputer 80 corrects the target evaporation temperature Teva high if the outside air temperature Tr detected by the outside air temperature sensor 74 is high, and corrects the target evaporation temperature Teva based on the outside air temperature in a region of a high temperature of the cooled space detected by the temperature Sensor 91 in the chamber. Now, the target evaporation temperature Teva when the outside air temperature is +32° C. is described. When the temperature in the chamber is +7° C. or higher, a drop in the temperature in the chamber is accompanied by a relatively slow reduction in the target evaporation temperature Teva. When the temperature in the chamber is lower than +7° C., a drop in the temperature in the chamber is accompanied by a sudden reduction in the target evaporation temperature Teva. That is, the refrigerant which flows in the refrigerant circuit is unstable in the high temperature in the chamber state. Thus, it is possible to prevent an abnormal increase in the pressure of the high side by setting the target evaporation temperature Teva relatively high.

In the low temperature in the chamber state, the state of the refrigerant which flows in the refrigerant circuit becomes stable. Thus, by setting the target evaporation temperature Teva relatively low, the chamber of the refrigerator main body 105 can be quickly cooled. As a result, it is possible to quickly lower the temperature in the chamber of the refrigerator main body 105 in restarting or the like after defrosting, and to maintain a temperature of articles housed therein at a proper value.

After the target evaporation temperature Teva is calculated by the aforementioned equation, the microcomputer 80 proceeds to step S14 to compare a current evaporation temperature with the target evaporation temperature Teva. If the current evaporation temperature is lower than the target evaporation temperature Teva, the rotational speed of the compressor 10 is decreased in step S16. If the current evaporation temperature is higher than the target evaporation temperature Teva, the rotational speed of the compressor 10 is increased in step S17. Next, in step S18, the microcomputer 80 determines the range of the highest and lowest rotational speeds decided in step S13 and the rotational speed increased/decreased in step S16 or S17.

Here, if the rotational speed increased/decreased in step S16 or S17 is within the range of the highest and lowest rotational speeds, the rotational speed is set as a target rotational speed. The compressor 10 is run by the inverter substrate at the target rotational speed in step S20 as described above.

On the other hand, if the rotational speed increased/decreased in step S16 or S17 is outside the range of the highest and lowest rotational speeds, the microcomputer 80 proceeds to step S19, makes adjustment based on the rotational speed increased/decreased in step S16 or S17 to achieve an optimal rotational speed within the range of the highest and lowest rotational speeds, sets the adjusted rotational speed as a target rotational speed, and runs the electric element of the compressor 10 at the target rotational speed in step S20. Thereafter, the process returns to step S4 to repeat subsequent steps.

Incidentally, when the start switch (not shown) disposed in the refrigerator main body 105 is cut off, or the power socket thereof is pulled out of the power plug, the energization of the microcomputer 80 is stopped (step S21 of FIG. 3), and thus the program is finished (step S22).

(5) Defrosting control of evaporator

Meanwhile, when the chamber of the refrigerator main body 105 is sufficiently cooled to lower the temperature in the chamber to a set lower limit (+3° C.), the control device 90 of the refrigerator main body 105 sends an OFF signal of the compressor 10 to the microcomputer 80. Upon reception of the OFF signal, the microcomputer 80 determines a start of defrosting in defrosting determination of step S7 of FIG. 3, proceeds to step S8 to stop the running of the compressor 10, and starts defrosting (OFF cycle defrosting) of the evaporator 92.

After the stop of the compressor 10, when the temperature in the chamber of the refrigerator main body 105 reaches a set upper limit (+7° C.), the control device 90 of the refrigerator main body 105 sends an ON signal to the compressor 10 of the microcomputer 80. Upon reception of the ON signal, the microcomputer 80 determines completion of defrosting in step S9, and proceeds to step S10 and after to resume running of the compressor 10 as described above.

(6) Forcible stop of compressor

Here, if the compressor 10 has been continuously run for a predetermined time, the microcomputer 80 determines a start of defrosting in defrosting determination of step S7 of FIG. 3, proceeds to step S8 to forcibly stop the running of the compressor 10, and then starts defrosting of the evaporator 92. Additionally, the continuous running time of the compressor 10 for stopping the same is changed based on the temperature in the chamber of the refrigerator main body 105 detected by the temperature Sensor 91 in the chamber. In this case, the microcomputer 80 sets the continuous running time of the compressor 10 for stopping the same shorter as the temperature in the chamber is lower.

A specific reason is that if the temperature in the chamber of the refrigerator main body 105 is low, e.g., +10° C., there is a fear of freezing of articles or the like housed in the refrigerator main body 105. Thus, according to the embodiment, for example, if the compressor 10 is continuously run for 30 min., while the temperature in the chamber is +10° C. or lower, it is possible to prevent a problem of freezing of the articles housed in the chamber by forcibly stopping the running thereof.

When the temperature in the chamber of the refrigerator main body 105 reaches the set upper limit (+7° C.), the control device 90 of the refrigerator main body 105 sends an ON signal of the compressor 10 to the microcomputer 80. Thus, the microcomputer 80 resumes running of the compressor 10 as in the previous case (step S9 of FIG. 3).

On the other hand, if the compressor 10 has been run at a temperature in the chamber higher than, e.g., +10° C., for a predetermined time, the microcomputer 80 stops the running thereof. This is because if the compressor 10 is continuously run for a long time, frosting occurs in the evaporator 92, and the refrigerant which passes through the evaporator 92 cannot be heat-exchanged with surrounding air, creating a fear of insufficient cooling of the chamber of the refrigerator main body 105. Thus, for example, if the compressor 10 is continuously run at a temperature in the chamber of a range higher than +10° C. to 20° C. or lower for 10 hours or more, or at a temperature in the chamber higher than 20° C. for 20 hours or more, the microcomputer 80 determines a start of defrosting in defrosting determination of step S7, and forcibly stops the running of the compressor 10 to execute defrosting of the evaporator 92 in step S8.

Figure 7:
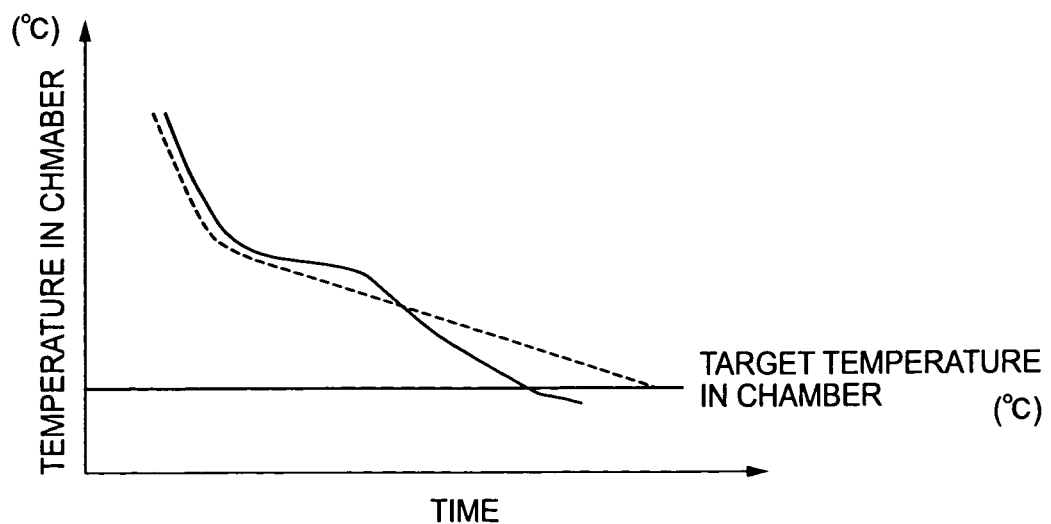
FIG. 7 is a view showing a change in temperature in the chamber in the cooling apparatus of the invention.

This state will be described with reference to FIG. 7. In FIG. 7, a broken line indicates a change in a temperature in the chamber when the running of the compressor 10 is not stopped to execute defrosting in the case of continuous running thereof at a temperature in the chamber higher than +10° C. but equal to/lower than 20° C. detected by the temperature sensor 91 in the chamber for 10 hours or more. A solid line indicates a change in a temperature in the chamber when the running of the compressor 10 is stopped to execute defrosting in the case of continuous running thereof at a temperature in the chamber higher than +10° C. but equal to/lower than +20° C. for 10 hours or more.

As shown in FIG. 7, the evaporator 92 can be defrosted by forcibly stopping the compressor 10 in the case of continuous running thereof at the temperature in the chamber higher than +10° C. but equal to/lower than +20° C. for 10 hours or more. Compared with the case of not stopping the compressor 10 to execute defrosting, a heat exchanging efficiency of the refrigerant in the evaporator 92 after the defrosting can be improved, and the target temperature in the chamber can be reached early. Thus, it is possible to improve a cooling efficiency.

Furthermore, as the temperature in the chamber of the refrigerator main body 105 is lower, the continuous running time of the compressor 10 for stopping the same is set shorter. Thus, it is possible to prevent freezing of the articles housed therein when the temperature in the chamber is low while improving the heat exchanging efficiency of the refrigerant in the evaporator 92 after defrosting as described above.

(7) Control of increase in highest rotational speed of compressor

Next, if the temperature in the chamber of the refrigerator main body 105 detected by the temperature Sensor 91 in the chamber is low, the microcomputer 80 increases the highest rotational speed (MaxHz) of the compressor 10. For example, when the temperature in the chamber of the refrigerator main body 105 is lowered to +20° C., the microcomputer 80 slightly increases the highest rotational speed (e.g., 4 Hz) to run the compressor 10 (state of(3) of FIG. 2). That is, in addition to the aforementioned control of the highest rotational speed based on the outside air temperature, when the temperature in the chamber of the refrigerator main body 105 is lowered to +20° C., the microcomputer 80 increases the highest rotational speed decided based on the outside air temperature detected by the outside air temperature sensor 74 as described above to 4 Hz to run the compressor 10.

When the temperature in the chamber of the refrigerator main body 105 drops to +20° C. or lower, pressure of the low side becomes low. Accordingly, pressure of the high side is also lowered to stabilize the refrigerant in the refrigerant circuit. If the rotational speed is increased in this state, even when the pressure of the high side slightly increases as shown in (4) of FIG. 2, it is possible to prevent a problem of an abnormal increase which exceeds design pressure of the device, the pipe or the like of the high side.

Additionally, an amount of a refrigerant circulated in the refrigerant circuit is increased by increasing the highest rotational speed. Thus, an amount of a refrigerant heat-exchanged with air circulated in the evaporator 92 is increased to enable improvement of the cooling efficiency thereof. As a result, an evaporation temperature of the refrigerant in the evaporator 92 is also lowered as shown in (5) of FIG. 2, and the chamber of the refrigerator main body 105 can be cooled early.

Incidentally, according to the embodiment, the microcomputer 80 runs the compressor 10 by holding the rotational speed thereof at 25 Hz for 10 min., if the temperature in the chamber of the refrigerator main body 105 is higher than +20° C. before the predetermined lowest rotational speed thereof is reached at the time of starting, and by holding the rotational speed of the compressor 10 at 25 Hz for 30 min., if the temperature in the chamber of the refrigerator main body 105 is +20° C. or lower. However, the holding time or the rotational speed is not limited to such, but can be properly changed in accordance with a size of the cooling apparatus 110 or a purpose of use.

According to the embodiment, the holding time of the rotational speed is changed based on the temperature in the chamber detected by the temperature sensor 91 in the chamber of the refrigerator main body 105. According to the invention, however, the holding time of the rotational speed may be fixed irrespective of the holding time.

Further, the temperature in the chamber is detected by the temperature sensor 91 in the chamber of the refrigerator main body 105. However, holding time of the rotational speed may be decided based on an output of the other sensor.

According to the embodiment, the cooling apparatus 110 is the showcase installed at the store. Not limited to this, however, the cooling apparatus of the invention may be used as a refrigerator, an automatic vending machine, or an air conditioner.

As described above in detail, according to the present invention, the cooling apparatus comprises the control device which controls the speed of rotation for the compressor between the predetermined lowest and highest speeds, and the cooled state sensor which can detect the cooled state of the space to be cooled by the evaporator included in the refrigerant circuit. The control device runs the compressor by holding the predetermined start-time holding speed of rotation lower than the lowest rotational speed for the predetermined time before the lowest rotational speed is reached after the compressor is started. Thus, it is possible to prevent an abnormal increase in the pressure of the high side.

Moreover, the cooling apparatus further comprises the detection means capable of detecting a state of a space to be cooled by an evaporator included in the refrigerant circuit. The control device shortens the holding time of the compressor when the temperature of the cooled space detected by the detection means is low, and extends the holding time thereof when the temperature of the cooled space is high. Thus, by properly changing the rotational speed holding time at the time of starting based on the temperature change of the cooled space, it is possible to effectively prevent an abnormal increase in the pressure of the high side while suppressing a drop in cooling efficiency of the cooled spate as much as possible.

Therefore, it is possible to improve reliability and performance of the cooling apparatus.

What is claimed is:

1. A cooling apparatus comprising:
    a refrigerant circuit which includes a compressor capable of controlling a speed of rotation, and uses carbon dioxide as a refrigerant; and
    a control means for controlling a speed of rotation for the compressor between predetermined lowest and highest speeds,
    wherein the control means runs the compressor by holding a predetermined start-time holding speed of rotation at a substantially constant level, lower than the lowest rotational speed for a predetermined time before the lowest rotational speed is reached after the compressor is started.

2. The cooling apparatus according to claim 1, further comprising detection means for detecting a state of a space to be cooled by an evaporator included in the refrigerant circuit,
    wherein the control means shortens the holding time of the compressor when a temperature of the cooled space detected by the detection means is low, and extends the holding time thereof when the temperature of the cooled space is high.

* * * * *